(12) United States Patent
Asakawa

(10) Patent No.: US 6,431,898 B1
(45) Date of Patent: *Aug. 13, 2002

(54) CARD CONNECTOR

(75) Inventor: Kazushige Asakawa, Kanagawa (JP)

(73) Assignee: The Whitaker Corporation, Wilmington, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/130,823

(22) Filed: Aug. 7, 1998

(30) Foreign Application Priority Data

Aug. 8, 1997 (JP) .............................. 9-227249

(51) Int. Cl.⁷ .............................................. H01R 13/62
(52) U.S. Cl. ...................................... 439/325; 439/630
(58) Field of Search ................................ 439/325, 630, 439/629, 628, 631, 632, 633, 634, 635, 636, 637, 188, 489, 260

(56) References Cited

U.S. PATENT DOCUMENTS

| 4,873,425 A | 10/1989 | Langlais et al. ............ 235/441 |
| 4,900,272 A | 2/1990 | Lange et al. ................. 439/630 |
| 4,938,716 A | 7/1990 | Chabrolle et al. ........... 439/635 |
| 5,012,078 A | 4/1991 | Pernet ........................ 235/441 |
| 5,667,408 A | * 9/1997 | Broschard, III et al. ..... 439/630 |

FOREIGN PATENT DOCUMENTS

| FR | 2 662 321 A1 | 4/1989 | .......... G06K/19/00 |
| JP | 2615161 | 6/1989 | .......... H01R/23/68 |

* cited by examiner

Primary Examiner—P. Austin Bradley
Assistant Examiner—Briggitte R. Hammond

(57) ABSTRACT

The present invention improves the durability of a card connector by providing a card-holding structure which does not have resilient parts.

Ribs (30) and grooves (32) are formed at corresponding positions in opposite inside surfaces (6a, 6b) of a rear end portion of a card-receiving slot (6) of a housing (2) to accommodate a card (C) inside housing (2). An upper surface of the inserted card extends into the grooves (32) by the ribs (30), so that the card is held between the ribs (30) and grooves (32).

6 Claims, 3 Drawing Sheets

CARD CONNECTOR

FIELD OF THE INVENTION

The present invention relates to a card connector, and more specifically relates to a card connector which holds a card by means of recessed and protruding surfaces located in a card-receiving slot that accommodates the card.

BACKGROUND OF THE INVENTION

Various types of card connectors are known. For example, the card connector 100 shown in FIG. 6 is disclosed in Japanese Patent No. 2,615,161 issued on May 28, 1997. In card connector 100, a card-receiving slot 110, which accommodates a card C', is located between a frame member 102 and a cover member 104. Electrical contacts 106 and biasing members 108, which possess resiliency, are disposed inside the card-receiving slot 110. When the card C' is inserted into the card-receiving slot 110, the card C' and contacts 106 are electrically connected, and the card C' is biased toward the cover member 104 by end portions 112 of the biasing members 108.

Since the biasing members 108 of the card connector 100 are cantilever members in the form of resilient arms, which are formed from a resin material, the resiliency of the biasing members 108 drops with an increase in temperature so that the initial biasing force can no longer be obtained, thus resulting in poor durability.

Since the housing is constructed from two parts, i.e., the cover member 104 and frame member 102, the number of parts required is increased. Since the biasing members 108 are exposed, they may easily be deformed or broken as a result of colliding with other members during the handling of the cover member 104.

SUMMARY OF THE INVENTION

The present invention was devised in light of the above points. An important feature of the present invention is to provide a card connector having a card-holding structure that is superior in terms of durability.

Another feature of the present invention is to provide a card connector which has a card-holding structure in which there is no danger of deformation or damage, and in which looseness of the card in the card-receiving slot is prevented.

Still another feature of the present invention is to provide a card connector with a card-holding structure which is easy to manufacture, which has a simple structure and which is inexpensive.

Yet another feature of the present invention is to provide a card connector with a housing which has an integral structure.

The card connector of the present invention has a housing provided with a card-receiving slot that accommodates a card, and electrical contacts that are mounted in the housing and are exposed inside the card-receiving slot, at least one protruding surface is located in one of the two opposite inside surfaces of the card-receiving slot that are substantially parallel to the direction of insertion of the card, while recessed surfaces are located in corresponding positions in the other of the two opposite inside surfaces, and the card is held in the card-receiving slot by the protruding and recessed surfaces.

It is desirable that the card-holding structure comprising recessed and protruding surfaces be integral parts inside the housing thereby providing an integral structure.

It is desirable that card-holding structures be formed at both ends of the housing.

BRIEF DESCRIPTION OF THE DRAWINGS

Embodiments of the present invention will now be described by way of example with reference to the accompanying drawings in which.

DETAILED DESCRIPTION OF THE INVENTION

Figure 1:
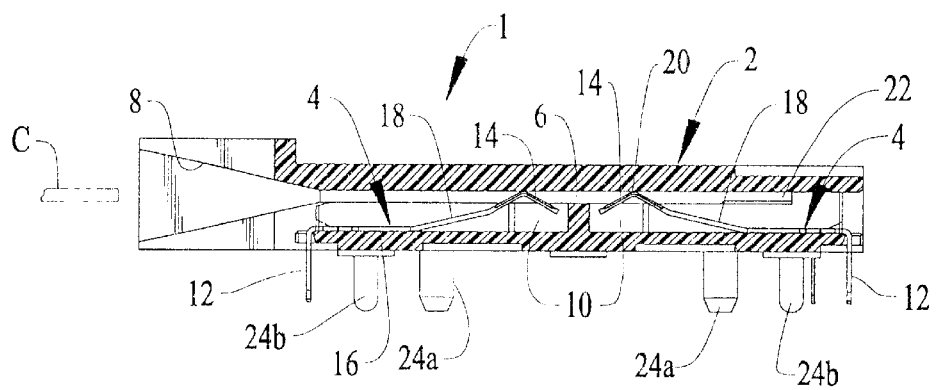
FIG. 1 is a longitudinal cross-sectional view of a card connector of the present invention.

The connector 1 as shown in FIG. 1 has an integrally-formed housing 2 which is made of a suitable resin, and a plurality of pairs of electrical contacts 4, which are mounted in housing 2. The housing 2 overall is formed with a flattened shape, and a card-receiving slot 6, which is used to accommodate a card C therein, is located inside housing 2.

Tapered surfaces 8, which are used to guide the inserted card C, are located at an entry side of the card-receiving slot 6, i.e., in a front portion of the housing 2. The respective electrical contacts 4 are disposed inside contact-receiving cavities 10, which face each other, and they are fastened in place by being press-fitted in recesses in the housing 2 by means of termination sections 12. Each contact 4 has a resilient arm 18, which rises upward at an inclination from a base section 16 that extends along the corresponding contact-receiving cavity 10. An end portion 14 of the resilient arm 18 is bent toward a bottom surface of the contact-receiving cavity, so that a portion of the end portion 14 that protrudes into the card-receiving slot 6 constitutes a contact member 20 for electrical engagement with a contact pad (not shown) on the card C when it is inserted into the card-receiving slot 6.

A rear end portion 22 of the card-receiving slot 6 is positioned at a rear end portion of the housing 2. Bosses 24a, 24b extend outwardly from a bottom surface of housing 2, and they are used for positioning and mounting the card connector on a printed circuit board (not shown).

Figure 2:
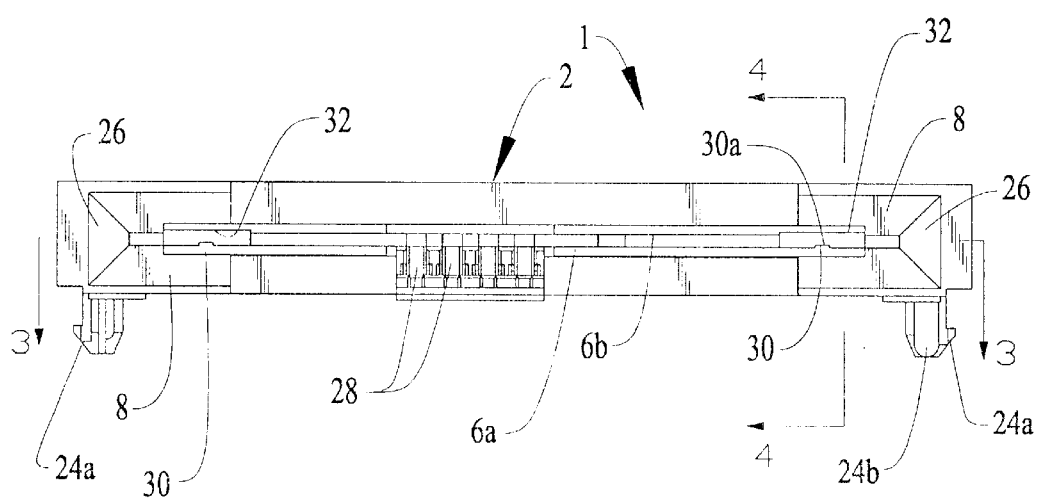
FIG. 2 is a front view of the card connector; however, the electrical contacts are omitted.

FIG. 2 shows a front view of the connector 1; however, the contacts 4 are omitted, and only the housing 2 is shown. Tapered surfaces 26, which are used to guide the card C, are located on both sides of the tapered surfaces 8 at the front end portion of the housing 2. Recesses 28, which are used for the attachment of the contacts 4, are adjacent to a lower surface 6a of the card-receiving slot 6. Ribs 30 are located adjacent the sides of the lower surface 6a, and grooves 32 are located in corresponding positions in an upper surface 6b. Respective card-holding structures are constituted by the ribs 30 and grooves 32, i.e., by these protruding and recessed surfaces. The width of the grooves 32 is approximately five times the width of the ribs 30, so that the grooves 32 have a sufficient width relative to the ribs 30. The card C, which is inserted into the card-receiving slot 6, is clamped by upper surfaces 30a of the ribs 30 so that side portions of card C pressed into the grooves 32. The details of the card holding structures will be described later.

Figure 3:
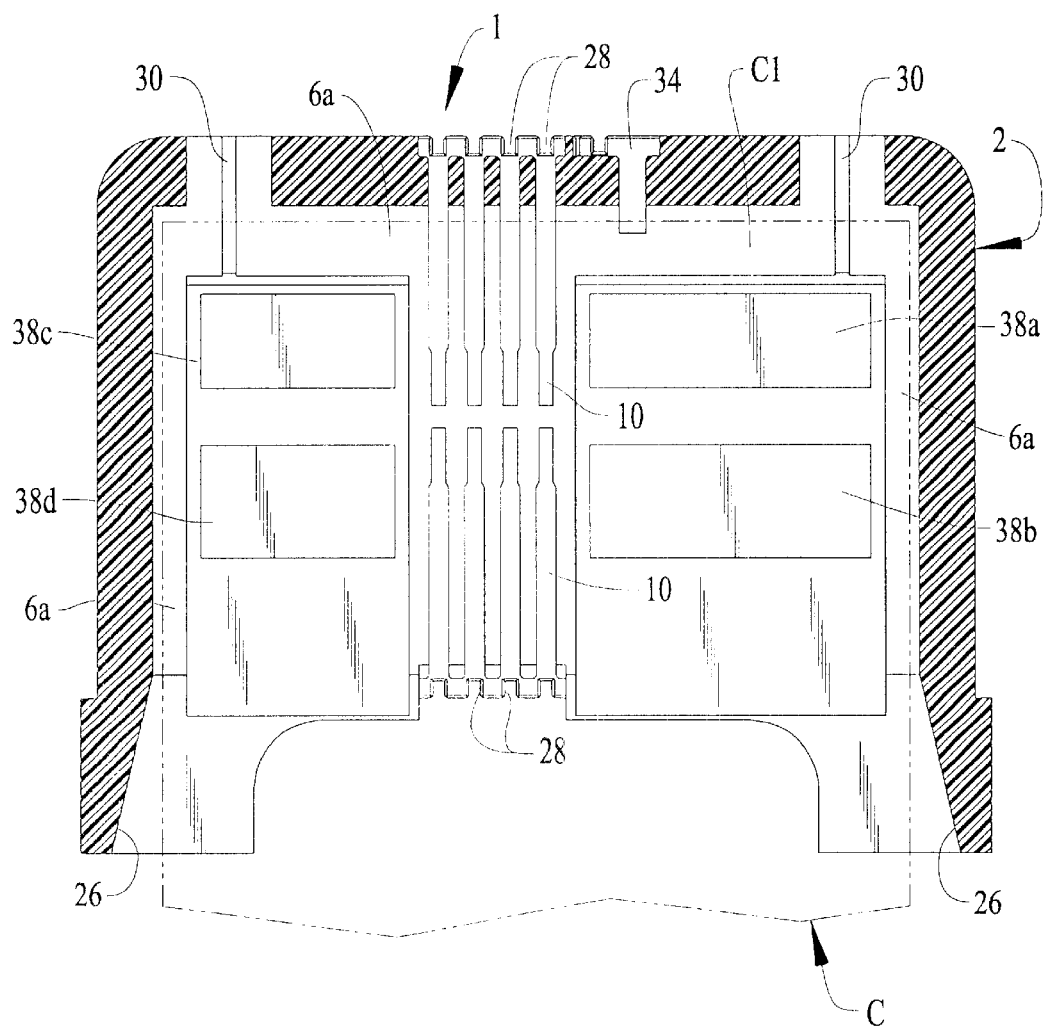
FIG. 3 us a cross-sectional view taken along line 3—3 in FIG. 2.

It may easily be seen from FIG. 3 that ribs 30 extend along the direction of insertion of the card C on the lower surface 6a of the card-receiving slot 6 at the rear end portion of the housing 2. The ribs 30 are formed by trimming of the mold in the forward-backward direction, i.e., in the vertical direction in FIG. 3. This method of formation may also be applied to the formation of the opposing grooves 32. Since the card C is inserted to the position indicated by the imaginary line shown in FIG. 3, two sections of the side portions of an end portion C1 of the card C engage the ribs 30.

Furthermore, a member (not shown) which detects that the card C has been completely inserted in the card-receiving slot 6, is disposed in recess 34; however, a detailed description of this construction will be omitted. Rectangular holes 38a–38d in lower surface 6a are respectively used for card insertion determination. In cases where the number of contacts 4 increases, ribs 30 can also be located between adjacent contact-receiving cavities 10; accordingly, the degree of freedom in design is large.

Figure 4:
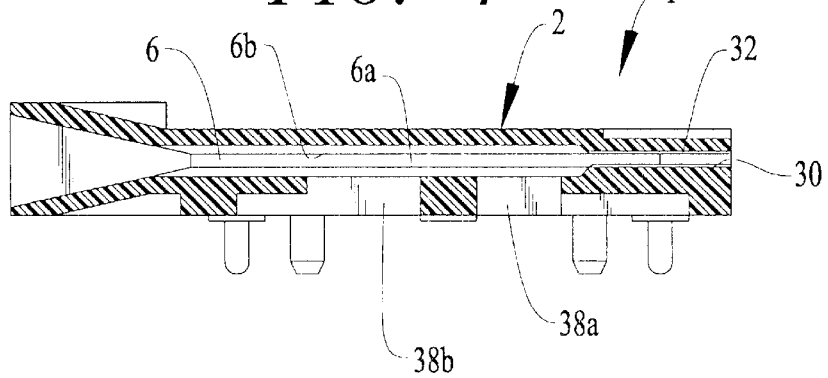
FIG. 4 is a cross-sectional view taken along line 4—4 in FIG. 2.

In FIG. 4, it can be seen that ribs 30 are located at the rear end portion of the lower surface 6a of the card-receiving slot 6, and that corresponding grooves 32 are located in the upper surface 6b opposite ribs 30. The holding of the card by the ribs 30 and grooves 32 will be described in greater detail with reference to FIG. 5.

Figure 5:
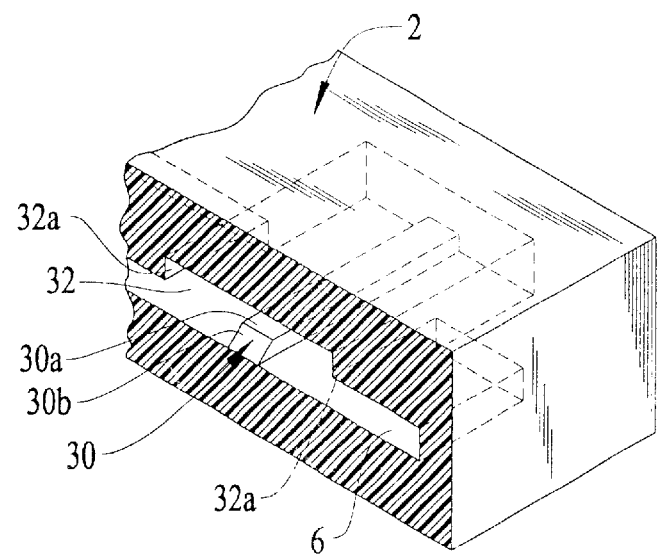
FIG. 5 is an enlarged partly-sectioned perspective view which cuts across one recessed groove and protruding rib along the end portions thereof.
Figure 6:
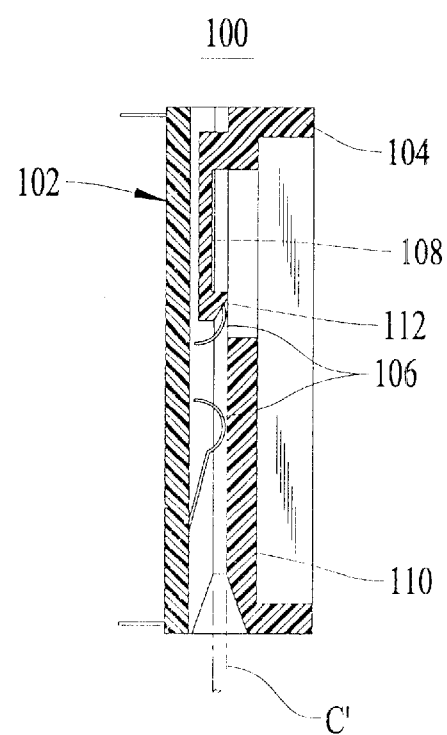
FIG. 6 is a cross-sectional view which shows a conventional card connector.

FIG. 5 is an enlarged part cross-sectional view which cuts across one groove 32 and rib 30 along the end portions thereof. A tapered surface 30b, which acts as a guide when the card C is accommodated in the card-receiving slot 6, is located on an end of each rib 30. When the card C is inserted into the card-receiving slot 6, an upper surface of the card C is pushed toward the corresponding groove 32 by the upper surface 30a of each rib 30, so that the upper surface of the card C bends slightly and extends into the groove 32. Accordingly, the card C is clamped by the upper surfaces 30a of the ribs 30 and the edges 32a, on both sides of each groove 32. In this way, a sufficient holding force is obtained without the card C being subjected to an excessive resistance during insertion into the card-receiving slot.

An embodiment of the present invention has been described in detail above. However, the present invention is not limited thereto; therefore, various modifications and alterations of the invention are possible.

For example, it would be possible to form the ribs 30 and grooves 32 in a reversed relationship. In other words, it would be possible to form the ribs on the upper surface 6b, and to form the grooves in the lower surface 6a. Furthermore, the height and width of the ribs and the depth and width of the grooves may be appropriately selected in accordance with the thickness of the card.

In the card connector of the present invention, recessed and protruding surfaces are located in opposite inside surfaces of a rear end portion of a card-receiving slot into which a card is inserted, and the card is held by the recessed and protruding surfaces. As a result, the present invention possesses the following merits: Specifically, there is no drop in the card-holding performance due to rises in temperature or repeated insertion, so that the durability of the connector is high. Furthermore, since these surfaces are formed as integral parts of the housing interior, there is no danger of deformation or breaking of the card-holding structure. In addition, the card-holding structure is simple and can be inexpensively manufactured.

What is claimed is:

1. A card connector comprising:
    a housing having a pair of opposed surfaces that are spaced-apart to define a card-receiving slot for receiving a card therein;
    electrical contacts mounted on the housing and having resilient arms provided with contact members extending into the card-receiving slot for electrical engagement with contact pads of the card when the card is inserted into the card-receiving slot; and
    a card-holding structure in the card-receiving slot including a rigid protruding member extending from one of the opposed surfaces into the card-receiving slot, and a recess in the other of the opposed surfaces of the card-receiving slot, the protruding member being located opposite the recess so that when the card is positioned within the card-receiving slot, a portion of the card is pushed into the recess by the protruding member, thereby holding the card within the card-receiving slot.

2. The card connector as claimed in claim 1, wherein the card-holding structure is located at an inner end of the card-receiving slot.

3. The card connector as claimed in claim 1, wherein the width of the recess is about five times the width of the protruding member.

4. The card connector as claimed in claim 1, wherein the protruding member and the recess are disposed adjacent one side of the card-receiving slot and another protruding member and another recess are disposed adjacent the other side of the card-receiving slot.

5. The card connector as claimed in claim 4, wherein the protruding members are ribs and the recesses are grooves with the ribs being disposed centrally of the recesses.

6. The card connector as claimed in claim 5, wherein inner ends of the ribs have tapered surfaces.

* * * * *